United States Patent
Bosnic, Jr. et al.

(10) Patent No.: US 9,665,769 B2
(45) Date of Patent: May 30, 2017

(54) HANDWRITING RECOGNITION WITH NATURAL USER INPUT ON MULTITOUCH SURFACES

(71) Applicant: International Business Machines Corporation, Armonk, NY (US)

(72) Inventors: Cameron J. Bosnic, Jr., Dracut, MA (US); Derek M. Harden, Norwalk, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/828,862

(22) Filed: Aug. 18, 2015

(65) Prior Publication Data
US 2017/0053161 A1    Feb. 23, 2017

(51) Int. Cl.
*G06K 9/00* (2006.01)
*G06F 3/041* (2006.01)
*G06T 7/20* (2017.01)

(52) U.S. Cl.
CPC ....... *G06K 9/00422* (2013.01); *G06F 3/0416* (2013.01); *G06T 7/20* (2013.01)

(58) Field of Classification Search
None
See application file for complete search history.

(56) References Cited

U.S. PATENT DOCUMENTS

| | | | |
|---|---|---|---|
| 5,544,257 A | 8/1996 | Bellegarda et al. | |
| 6,323,846 B1 | 11/2001 | Westerman et al. | |
| 7,646,913 B2 * | 1/2010 | Abdulkader | G06K 9/00422 382/119 |
| 8,280,169 B2 | 10/2012 | Linderman | |
| 8,358,320 B2 | 1/2013 | Zhou et al. | |
| 8,396,295 B2 | 3/2013 | Gao et al. | |
| 8,565,535 B2 * | 10/2013 | Shamaie | G06F 3/017 382/187 |
| 8,817,087 B2 | 8/2014 | Weng et al. | |
| 2007/0070051 A1 | 3/2007 | Westerman et al. | |

(Continued)

FOREIGN PATENT DOCUMENTS

WO    2014106849 A1    7/2014

OTHER PUBLICATIONS

Baryer, Andy, "Getting started with the S Pen on the Samsung Galaxy Note 4", Oct. 30, 2014, © CBS Interactive Inc., 4 pages, <http://www.cnet.com/how-to/how-to-samsung-galaxy-note-4-s-pen/>.

(Continued)

*Primary Examiner* — Vikkram Bali
(74) *Attorney, Agent, or Firm* — Bryan D. Wells; Daniel R. Simek

(57) ABSTRACT

The method includes receiving, by one or more computer processors, data indicating a hand is on a touch-sensitive surface. The method further includes identifying, by one or more computer processors, a position of the hand. The method further includes determining, by one or more computer processors, a change in the position of the hand. The method further includes characterizing, by one or more computer processors, the change in position of the hand on the touch-sensitive surface. The method further includes generating, by one or more computer processors, an alphanumeric character based upon the characterized change in the position of the hand.

12 Claims, 4 Drawing Sheets

(56) References Cited

U.S. PATENT DOCUMENTS

| | | |
|---|---|---|
| 2008/0041639 A1 | 2/2008 | Westerman et al. |
| 2013/0021242 A1 | 1/2013 | He et al. |
| 2013/0234957 A1* | 9/2013 | Shirato ................ G06F 3/0416 345/173 |
| 2014/0104225 A1* | 4/2014 | Davidson ................ G06F 3/044 345/174 |

OTHER PUBLICATIONS

Bharath, et al., "FreePad: A Novel Handwriting-based Text Input for Pen and Touch Interfaces", Submitted to 2008 International Conference on Intelligent User Interfaces (IUI'08), Jan. 13-16, 2008, © 2008 ACM, 5 pages.

Schauland, Derek, "Microsoft Surface Pro2 101: Utilize handwriting recognition", Nov. 25, 2013, 5 pages, <http://www.techrepublic.com/blog/tablets-in-the-enterprise/microsoft-surface-pro-2-101-utilize-handwriting-recognition/>.

Schick, et al., "Vision-Based Handwriting Recognition for Unrestricted Text Input in Mid-air", ICMI '12 Proceedings of the 14th ACM International Conference on Multimodal Interaction, Oct. 22-26, 2012, 6 pages, <http://iosb.fraunhofer.de/servlet/is/6635/sp202-schick.pdf>.

"Samsung Galaxy Note 4 (AT&T), Charcoal Black", downloaded May 27, 2015, 4 pages, <http://www.samsung.com/us/mobile/cell-phones/SM-N910AZKEATT>.

Bosnic, Jr. et al., "Handwriting Recognition With Natural User Input on Multitouch Surfaces", U.S. Appl. No. 15/082,054, filed Mar. 28, 2016, 26 pages.

IBM, "List of IBM Patents or Patent Applications Treated as Related", Appendix P, 2 pages, dated Mar. 28, 2016.

\* cited by examiner

HANDWRITING RECOGNITION WITH NATURAL USER INPUT ON MULTITOUCH SURFACES

BACKGROUND OF THE INVENTION

The present invention relates generally to user input on a computing device, and more specifically to associating a user input on a multi-touch surface with a specific computer action.

Portable computing devices, such as smart phones, tablet computers, and satellite navigation systems are becoming more prevalent. Comprehensive applications are being created to utilize the capabilities of these portable computing devices. Portable computing devices typically include a touch screen and a multitude of other sensors that allow for interaction between a user and the device.

Touch screens allow a user to make selections or move a cursor by touching the touch screen via a finger or stylus. In general, touch screens can recognize the size, shape, and position of the touch and output this information to a host device. The host device may be a handheld computer, a tablet computer, or a smart phone. Some touch screens recognize single touches, while others can recognize multiple, simultaneous touches. Devices with screens are probably the most familiar touch screen technology, and the most heavily used touch screen technology right now. Touch fabrics, and other touch enabled surfaces, despite not having a screen, allow for interaction between a user and the device.

Touch screens typically include a touch panel, a display screen, and a controller. The touch panel is a clear panel with a touch-sensitive surface. The touch panel is positioned in front of the display screen so that the touch-sensitive surface covers the viewable area of the display screen. The touch panel registers touches and sends these signals to the controller. The controller processes these signals into data and sends the data to the host device. Any device that houses a touch screen generally provides an application programming interface (API) that programs can call to utilize the data.

SUMMARY

Aspects of the present invention disclose a method, computer program product, and a system for character identification on a multi-touch surface. The method includes receiving, by one or more computer processes, data indicating a hand is on a touch-sensitive surface. The method further includes identifying, by one or more computer processors, a position of the hand. The method further includes determining, by one or more computer processors, a change in the position of the hand. The method further includes characterizing, by one or more computer processors, the change in position of the hand on the touch-sensitive surface. The method further includes generating, by one or more computer processors, an alphanumeric character based upon the characterized change in the position of the hand.

DETAILED DESCRIPTION

Embodiments of the present invention allow for a user to interact with a touch device in a way that is seamless and familiar. Some embodiments of the present invention recognize that the methods through which users interact with touch screen technology are inefficient and outdated. The current method of user input severely limits the ability to interact with touch screen based technologies because there is an adaptation process for new users, and the current methods are unfamiliar and cumbersome. Typing or writing on a touch screen is challenging because users are accustomed to tactile feedback. The current invention recognizes that contemporary technology does not allow the user to interact with touch screen technology that is familiar and seamless.

Implementation of embodiments of the invention may take a variety of forms, and exemplary implementation details are discussed subsequently with reference to the Figures.

Figure 1:
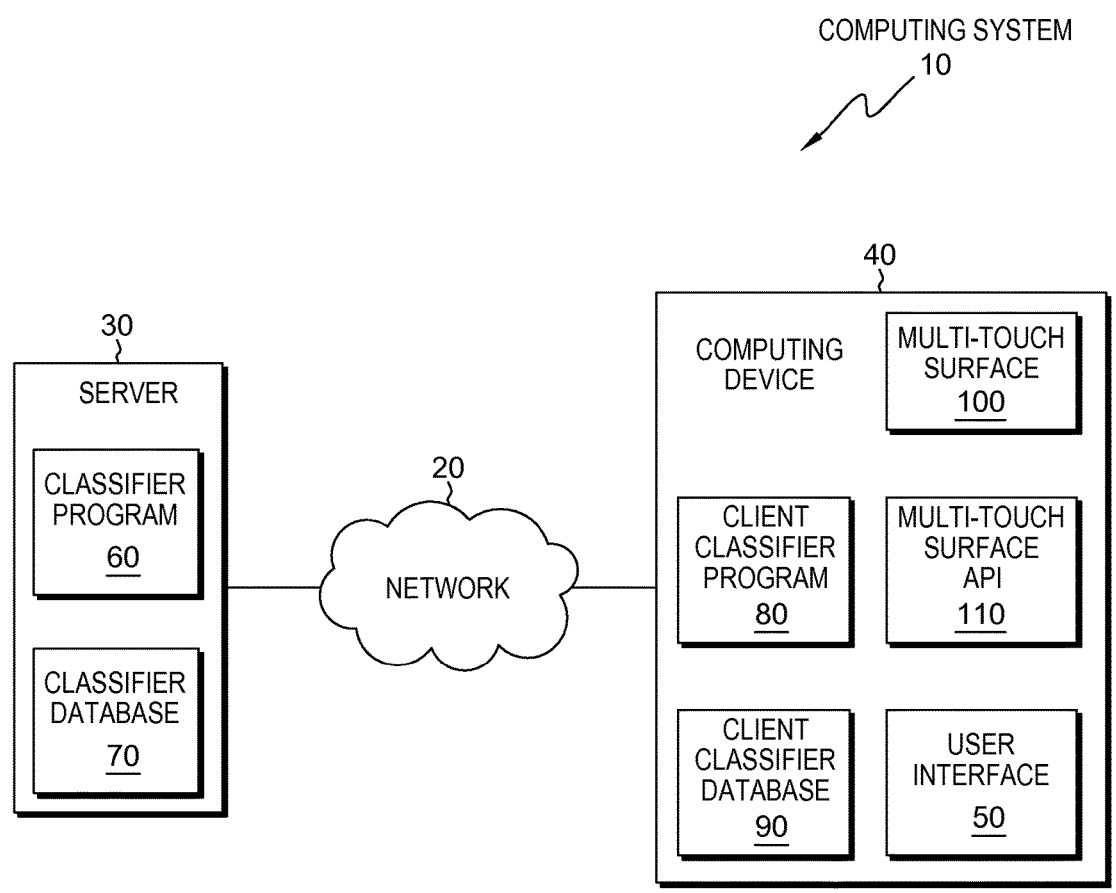
FIG. 1 is a functional block diagram illustrating a distributed data processing environment, in accordance with one embodiment of the present invention.

The present invention will now be described in detail with reference to the Figures. FIG. 1 depicts a diagram of a computing system 10, in accordance with one embodiment of the present invention. FIG. 1 provides only an illustration of one embodiment and does not imply any limitations with regard to the environment in which different embodiments may be implemented. Many modifications to the depicted environment may be made by those skilled in the art without departing from the scope of the invention as recited by the claims.

In the depicted embodiment, computing system 10 includes server 30 and computing device 40, interconnected over network 20. Network 20 may be a local area network (LAN), a wide area network (WAN), such as the Internet, a cellular data network, any combination thereof, or any combination of connections and protocols that will support communications between server 30, computing device 40, and classifier program 60, in accordance with embodiments of the invention. Network 20 may include wired, wireless, or fiber optic connections. Computing system 10 may include additional computing devices, servers, or other devices not shown that are able to communicate with computing device 40 and server 30 via network 20.

Server 30 may be a management server, a web server, or any other electronic device or computing system capable of processing program instructions and receiving and sending data. In some embodiments, server 30 may be a laptop computer, a tablet computer, a netbook computer, a personal computer (PC), a desktop computer, or any programmable electronic device capable of communicating with computing device 40 via network 20. In other embodiments, server 30 may represent a server computing system utilizing multiple computers as a server system, such as in a cloud computing environment. In the depicted embodiment, server 30 contains classifier program 60 and classifier database 70. In other embodiments, server 30 may include classifier program 60, classifier database 70, and/or other components, as depicted and described in further detail with respect to FIG. 4.

Computing device 40 may be a desktop computer, a laptop computer, a netbook computer, or a tablet computer. In general, computing device 40 may be any electronic device or computing system capable of processing program instructions, sending and receiving data, and communicating with server 30 via network 20. In the depicted embodiment, computing device 40 contains user interface 50, client classifier program 80, client classifier database 90, multi-touch surface 100, and multi-touch surface application programming interface (API) 110. In other embodiments, computing device 40 may include user interface 50, client classifier program 80, client classifier database 90, multi-touch surface 100, multi-touch surface API 110, and/or other components, as depicted and described in further detail with respect to FIG. 4.

User interface 50 may be any user interface that an individual can utilize to access information from computing device 40 or server 30. User interface 50 is capable of accessing information gathered and/or produced by classifier program 60. In some embodiments, user interface 50 may be a generic web browser used to retrieve, present, and negotiate information resources from the Internet. In other embodiments, user interface 50 may be a software program or application that enables a user at computing device 40 to access server 30 over network 20. In the depicted embodiment, user interface 50 is capable of operating, on computing device 40, in conjunction with multi-touch surface 100 to visualize content, such as icons and application material, and allow a user to select a specific location on the touch screen.

A user interface, such as user interface 50, refers to the information (such as graphic, text, and sound) that a program presents to a user and the control sequences the user employs to control the program. There are many known types of user interfaces. In one embodiment, user interface 50 is a graphical user interface. A graphical user interface (GUI) is a type of user interface that allows users to interact with electronic devices, such as a multi-touch surface (e.g., multi-touch surface 100), a touch screen, a computer keyboard, and a mouse, through graphical icons and visual indicators, such as secondary notation. The actions in GUIs are often performed through direct manipulation of the graphical elements. In some embodiments, user interface 50 may comprise one or more interfaces, such as, an operating system interface and application interfaces. In an example, user interface 50 receives data characterizing input from multi-touch surface API 110 that is created from the touch of a user on multi-touch surface 100 and sends the data to client classifier program 80 or client classifier database 90. In other embodiments, user interface 50, or similar user interfaces, may reside on another computing device, another server, or server 30 provided that user interface 50 is accessible to classifier program 60.

Classifier program 60 converts finger and hand motion on a surface into a letter character. In some embodiments, classifier program 60 may receive data from a user interface indicating a position of a hand on a surface. The user interface may continually send data to classifier program 60 as the position of a hand on the surface changes. In some embodiments, classifier program 60 may convert the motion of a hand on a surface, as tracked by a user interface, into a character. In an example, classifier program 60 utilizes an algorithm to convert hand motion on a surface into a letter character with the input of previously stored classifiers. In some embodiments, each algorithm that classifier program 60 uses is an image processing based, motion detecting kinesthetic classifier that interprets user input. In an example, classifier program 60 receives finger or hand motion input. Classifier program 60 analyzes user input based on previously selected user classifiers. Classifiers interpret user input and are a means to map a user input to an output. On a broad level, classifiers are language specific. For example, a the classifier will know that a user prefers to write in English based upon the language present on the display, the geographic location chosen, personal settings of the multi-touch device, or settings a user has chosen in the past. In various embodiments, classifier program 60 may utilize a training phrase to characterize a finger or hand motion for a user into specific classifiers.

In some embodiments, classifier program 60 selects specific classifiers based upon the larger set of previously selected movement classifiers. Some examples of specific classifiers are: block writing style, curvy writing style, and calligraphy. Generally, classifier program 60 may allow a user to select various languages, handwriting types, and/or handwriting styles to further classify and store in classifier database 70 as a profile. In some embodiments, classifier program 60 may send supplemental classifier information to client classifier program 80. In the depicted embodiment, classifier program 60 resides on server 30. In other embodiments, classifier program 60 may reside on another server, computing device, or computing device 40 provided that classifier program 60 can access classifier database 70 and user interface 50 via network 20.

Classifier database 70 may be a repository that may be written to and/or read by classifier program 60. A database is an organized collection of data. In some embodiments, a program (not shown) may allow a user to select various languages, handwriting types, and/or handwriting styles to classify and store in classifier database 70. In other embodiments, classifier database 70 may store user profiles, which contain specific classifiers for a user based upon writing style, language, etc., that were previously classified. In the depicted embodiment, classifier database 70 resides on server 30. In other embodiments, classifier database 70 may reside on another server, computing device, computing device 40, or independently as a standalone database that is capable of communicating with server 30 and computing device 40 via network 20.

Client classifier program 80 converts finger and hand motion on a surface into one or more characters. In some embodiments, client classifier program 80 may receive data from user interface 50 indicating a position of a hand on a surface. User interface 50 may continually send data to client classifier program 80 as the position of a hand on multi-touch surface 100 changes. In some embodiments, client classifier program 80 may convert the motion of a hand on multi-touch surface 100, as tracked by user interface 50, into a character. In an example, client classifier program 80 utilizes an algorithm to convert hand motion on multi-touch surface 100 into a letter character with the input of previously stored classifiers on client classifier database 90. In some embodiments, each algorithm that client classifier program 80 uses is an image processing based, motion detecting kinesthetic classifier that interprets user input. In an example, client classifier program 80 receives finger or hand motion input. Client classifier program 80 analyzes user input based on previously selected user classifiers. Client classifier program 80 sends data characterizing user input from multi-touch surface 100 and multi-touch surface API 110 to user interface 50 on computing device 40.

In various embodiments, client classifier program 80 may utilize a training phase to characterize a finger or hand motion for a user into specific classifiers. In some embodiments, client classifier program 80 selects specific classifiers based upon the larger set of previously selected movement classifiers. In the depicted embodiment, client classifier program 80 resides on computing device 40 and is capable of interacting with user interface 50 independent of server 30 and network 20. In some embodiments, client classifier program 80 may receive information from classifier program 60, wherein the additional information contains additional classifiers for a user profile, user profiles, past user input, etc. In other embodiments, client classifier program 80 may reside on another server, computing device, or peer to peer network.

Client classifier database 90 may be a repository that may be written to and/or read by client classifier program 80. A database is an organized collection of data. In some embodiments, a program (not shown) may allow a user to select various languages, handwriting types, and/or handwriting styles to classify and store in client classifier database 90. In other embodiments, client classifier database 90 may store user profiles, which contain specific classifiers for a user based upon writing style, language, etc., that were previously classified. In the depicted embodiment, client classifier database 90 resides on computing device 40. In other embodiments, client classifier database 90 may reside on another server, or computing device, or independently as a standalone database that is capable of communicating with server 30 and computing device 40 via network 20.

Multi-touch surface 100 is integrated with computing device 40. Multi-touch surface 100 may be a handheld computer, a tablet computer, a smart phone, a touch fabric, a mousepad, a touch pad, a screen, or any touch-enabled surface. Multi-touch surface 100 is configured to receive input from a user's touch and to send parameters characterizing the input from the user's touch to client classifier program 80 or to a user interface.

Generally, the parameters from multi-touch surface 100 can be accessed by a program called an application programming interface (API). Multi-touch surface API 110 is located on computing device 40. The parameters can be raw data from multi-touch surface 100 or information on the size, shape, and position of the touch. In one embodiment, the parameter characterizing the input from the user's touch is the shape of the input from the user's touch. The shape of the input from the user's touch can be defined as an ordered list of points describing the path that forms the bounds of the input and/or an ordered list of two-dimensional geometric segments describing the path that forms the bounds of the input. An ordered list of points or segments may be referred to as a polyline.

In some embodiments, client classifier program 80 may function when a display may not be located under the touch-compatible surface. Touch-sensitive fabrics are a durable fabric that can control a range of functions and differentiate tactile motions. The electrical properties of the touch-sensitive fabric change depending on where the fabric is touched.

Figure 2:
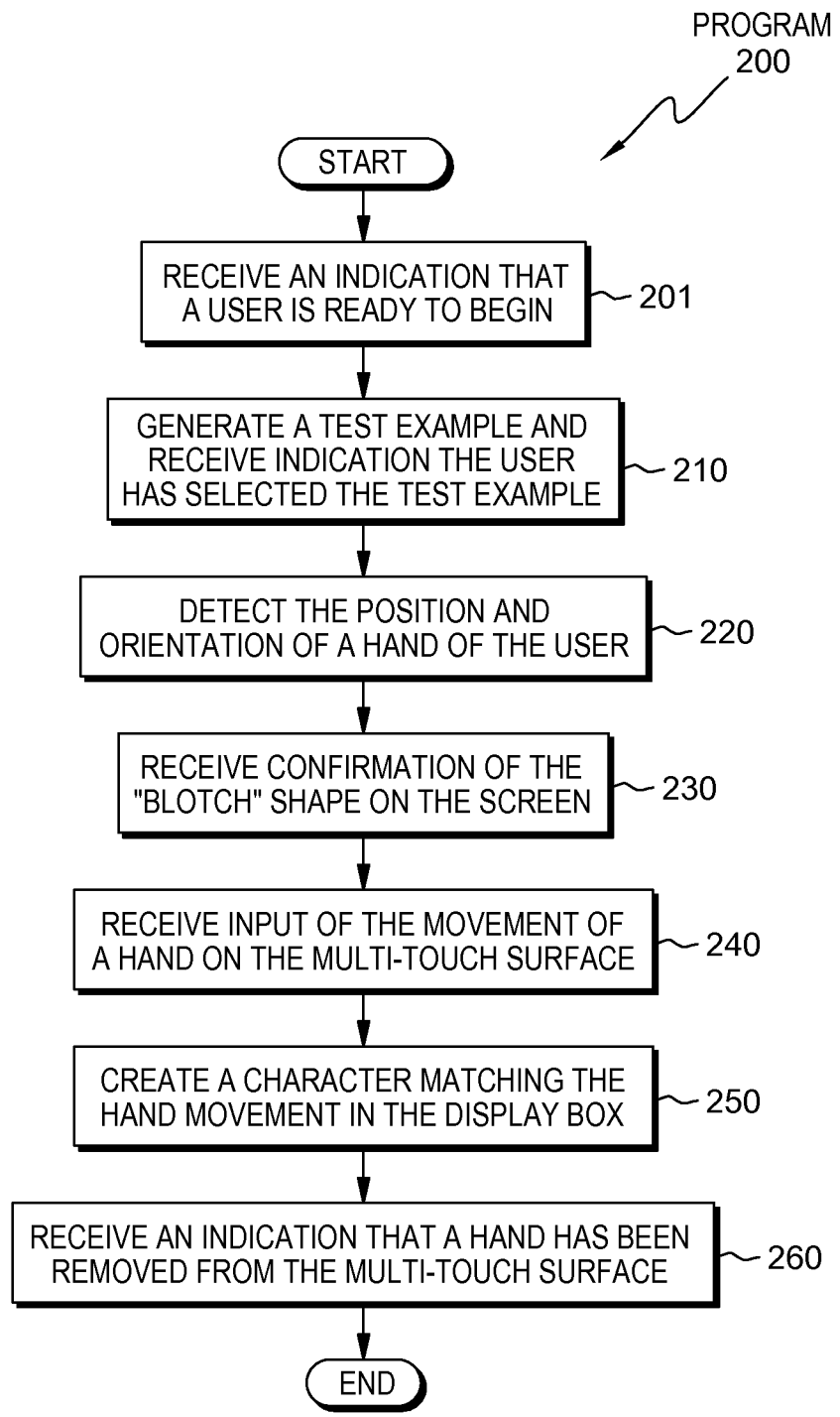
FIG. 2 depicts a flowchart depicting operational steps of a program for classification of handwriting, executing within the computing system of FIG. 1, in accordance with one embodiment of the present invention.

FIG. 2 depicts a flowchart of the steps that program 200 executes within computing device 40 on computing system 10 of FIG. 1 for performing a computer action based on a user input of a computing system, in accordance with one embodiment of the present invention. Program 200 is a function of client classifier program 80, in accordance with an embodiment of the present invention. In some embodiments, the operational steps of program 200 are initiated in response to client classifier program 80 receiving, from user interface 50, the shape of the input from the user's touch on multi-touch surface 100. In other embodiments, the operational steps of program 200 initiate in response to client classifier database 90 receiving, from user interface 50, an indication that the user is requesting set up from client classifier program 80.

In step 201, program 200 receives an indication that a user is ready to begin by a user selecting an area on a multi-touch surface. In one embodiment, program 200 sends to user interface 50 a prompt for the user to enter a user input on multi-touch surface 100. In another embodiment, program 200 receives input from a user when a user selects an area to type on multi-touch surface 100. In an example, a user types with the finger of the user. For example, program 200 queries a user on computing device 40 to touch multi-touch surface 100. In another example, on a touch pad, program 200 maintains a textbox on multi-touch surface 100 until a user selects the start box.

In step 210, program 200 generates a test example and receives indication the user has selected the test example. A test example is a prompt from program 200 for a user to write a few alphanumeric characters that could be matched with a classifier a user most closely identifies. In one embodiment, program 200 queries a user to write a sentence. For example, program 200 displays a randomly chosen word, such as "outside," for a user to write. Program 200 selects primary classifiers based on how the user created the letter. In another embodiment, program 200 presents a user with a list of primary classifiers to select. The primary classifiers are the most general parameters through which program 200 classifies a user. For example, program 200 queries a user to manually select general classifiers, geographic location, language, and the dominant, left or right, writing hand. The shape of the input from the touch of a user in the test example can be defined as an ordered list of points describing the path that forms the bounds of the input and/or an ordered list of two-dimensional geometric segments describing the path that forms the bounds of the input. An ordered list of points or segments may be referred to as a polyline.

In yet another embodiment, program 200 queries the user to superimpose the bottom side of a palm on the touch screen. For example, program 200 detects the shape of the input from a superimposed user hand from multi-touch surface 100 on a computer touch screen panel. In another example, multi-touch surface 100 is a mouse pad. A user moves the cursor using two fingers on multi-touch surface 100 to orient the cursor over the test example box. A user then clicks the box, with the fingers of a user, by tapping on multi-touch surface 100.

In step 220, program 200 detects the position and orientation of a hand of the user. In one embodiment, program 200 queries a user to place one hand on the multi-touch surface (e.g., multi-touch surface 100). Then program 200 queries the user to place the other hand on the multi-touch surface after a user removes the first hand. In another embodiment, program 200 receives user input that a hand is on the multi-touch surface. For example, program 200 determines that the shape of the input on multi-touch surface 100 matches a pre-defined shape corresponding to the hand used during the test example within a specific error of tolerance.

In step 220, specific error tolerance can be defined by multiple samples of the shape of the touch of a user on multi-touch surface 100. The multiple samples set a range of acceptable shapes. The shape of the input from a touch of the user must be within an acceptable range. In another example, program 200 queries client classifier database 90 to identify a plurality of selected classifiers corresponding to the hand used during the test example process. Program 200 identifies handwriting characteristics of received input. Program 200 then identifies one or more classifiers in the database that are associated with information that indicates that the classifiers correspond to the identified handwriting characteristics. For example, if program 200 determines that the right hand enters the user input on the touch screen, then program 200 queries client classifier database 90 and identifies the selected classifiers corresponding to the right hand. Specifically, a user may select the classifier for messy handwriting, or alternatively a user may select a block writing style. In the event multiple classifiers are being run simultaneously, output may be determined by a combination of level of confidence from each classifier and agreement between multiple classifiers.

In step 230, program 200 receives confirmation of a shape input, input from a hand of a user onto the screen by the user. In one embodiment, program 200 determines the hand used to enter the user input on a multi-touch surface. In another embodiment, program 200 queries the user to touch the multi-touch surface to confirm the shape on the surface is correct. For example, program 200 receives, from user interface 50, parameters characterizing the user input on multi-touch surface 100 corresponding to the hand used to enter the user input and a specific computer action. In yet another embodiment, the shape of the input from the touch of a user characterizes the parameters as discussed previously. For example, the shape of the user input for the right hand right click computer action is the shape of the part of the middle finger of the user in contact with multi-touch surface 100.

In step 240, program 200 receives input of the movement of a hand on the multi-touch surface. Program 200 receives input from the shape of a hand of a user and from the geometry and movement of the side of the hand of a user. Specifically, program 200 tracks the side of a pinky finger, palm, and joint of a user. However, program 200 initially receives and registers input of an outline of a hand of a user on the multi-touch surface. After program 200 receives an indication that the hand on the surface, then program 200 ignores the rest of the hand and registers movement of the hand. In one embodiment, program 200 receives further input indicating hand movement from multi-touch surface 100 via user interface 50. For example, program 200 tracks the movement of the hand of a user through a graphical user interface (GUI). User interface 50 receives data characterizing the input from the touch of a user on multi-touch surface 100, from multi-touch surface API 110, and reports the data to program 200 or client classifier database 90.

In step 250, program 200 generates an alphanumeric character matching the hand movement in the display box. In one embodiment, a user places a hand on a multi-touch surface and moves a hand as though writing with a pen. For example, on a touch pad, a user moves a hand over multi-touch surface 100 to create alphanumeric characters corresponding to the input. In another example, on a multi-touch surface designed to capture signatures, a user places the side of the palm of the hand of a user on multi-touch surface 100 and moves a hand as if a user is writing a signature. The alphanumeric character matching the movement of the hand is generated in the display box. Program 200 tracks the geometry and movement of the side of the hand, pinky finger, palm, and joints of a user. This process repeats until program 200, described in the next step, stops receiving input for a preset length of time.

In step 260, program 200 receives an indication that a hand has been removed from the multi-touch surface. In one embodiment, a set amount of time that has elapsed since the last user input. Program 200 queries a user to store all the selected information, primary and secondary classifiers, as a profile for said user, when a user has completed the writing process for the first time. For example, in step 250, program 200 generates characters. Program 200 no longer receives user input from multi-touch surface 100 through a graphic user interface (e.g., user interface 50). In another embodiment, a user selects a box to indicate a user is finished entering text. In another example, on a touch pad, program 200 maintains a textbox on multi-touch surface 100 until a user selects, with a finger, the end box.

Figure 3:
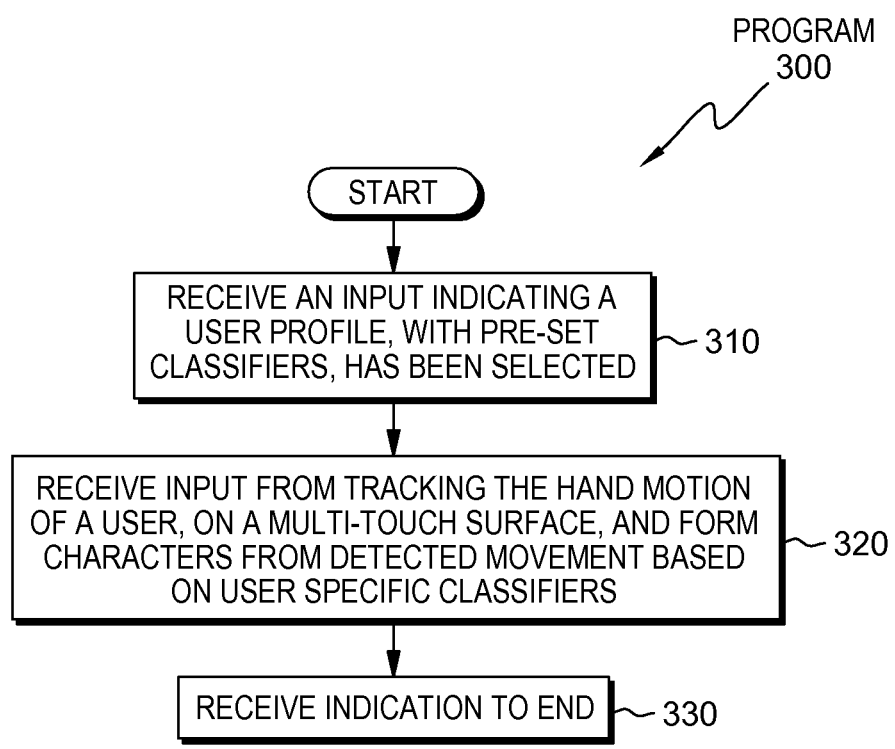
FIG. 3 depicts a flowchart of the steps of downloading a classification program, executing within the computing system of FIG. 1, in accordance with another embodiment of the present invention.

FIG. 3 depicts a flowchart of the steps that program 300 executes within computing device 40 on the computing system 10 of FIG. 1 for performing a computer action based on a user input of a computing system, in accordance with one embodiment of the present invention. Program 300 is a function of client classifier program 80, in accordance with at least one embodiment of the present invention. In one embodiment, the operational steps of program 300 begin when a user places a hand on a multi-touch surface (e.g., multi-touch surface 100). In another embodiment, program 300 queries a user to select a previously configured user profile.

In step 310, program 300 receives an input indicating a user profile with pre-set classifiers has been selected. In one embodiment, program 300 queries a user to select a previously configured profile. For example, program 300 queries client classifier database 90 to send previously configured classifiers corresponding to a user profile. In another embodiment, program 300 queries a user to select a previously configured profile and requests a user to choose additional classifiers. For example, program 300 may present an option for a user to edit, at any time, previously selected classifiers, or for a user to choose additional or replacement classifiers. A user may choose to write with a different set of classifiers for a different type of document. In yet another embodiment, program 300 may present a user with the option for program 300 to automatically detect and change classifiers based upon the input of a user. For example, program 300 can continuously and randomly alter the input of a user to mimic the input of a different user, archetype, or standard, despite the parameters of the profile of said user. Software and data used to practice embodiments of the present invention, e.g., program 300, can be stored on such portable computer readable storage media and can be loaded onto persistent storage 405 of computer system 400.

In step 320, program 300 receives input from tracking the hand motion on a multi-touch surface and forms alphanumeric characters from detected movement based on user specific classifiers. Program 300 receives input from the shape of a hand of a user and from the geometry and movement of the side of the hand of a user. Specifically, program 300 tracks the side of a pinky finger, palm, and joint of a user. However, program 300 initially receives and registers input of a hand of a user on the multi-touch surface. After program 300 receives an indication that the hand is on the surface, then program 300 ignores the rest of the hand and registers movement of the hand. In some embodiments, program 300 creates whole words based on a user input in addition to forming single alphanumeric characters. Using an algorithm, program 300 generates a character matching the hand movement in the display box with respect to the general classifiers chosen by a user, and the specific classifiers that are part of the refining process during the writing. General classifiers are primary classifiers, such as geographic location, language, and the dominant, left or right, writing hand. Specific classifiers are secondary qualifiers used to further refine the input of a user. For example, font, writing style, block, curvy, etc., or another qualification, such as the writing size. In one embodiment, a user places a hand on a multi-touch surface and moves a hand, naturally, as though a user is writing with a pen or pencil. Program 300, via a graphical user interface, such as user interface 50, analyzes and tracks the profile of a user hand on multi-touch surface 100.

Program 300 tracks the geometry and movement of the side of a palm, the side of a pinky finger, and the joints of a user. For example, on a touch pad, the side of the palm of a user is on multi-touch surface 100 and oriented as if a user were holding a writing utensil. Program 300 tracks the pen grip portion of a hand on multi-touch surface 100. Program 300 specifically tracks the slight movements of the hand of a user when a user mimics normal writing movements to create corresponding alphanumeric characters. In another example, a user moves a hand over multi-touch surface 100 to create corresponding alphanumeric characters that have been refined for a right-handed user in English and old English font in block style. In yet another example, on a multi-touch surface designed to capture signatures, a user places the side of the hand of the user on the multi-touch surface and moves the hand of the user to perform a signature. The alphanumeric character matching the movement of the hand is generated in the display box. In various embodiments, step 320 is repeated until a user has finished writing.

In step 330, program 300 receives indication to end. In one embodiment, program 300 no longer detects the hand of a user. In one embodiment, a set amount of time has elapsed since the last user input. For example, program 300 continually receives feedback via a graphic user interface, such as user interface 50, through a positive feedback loop. When the hand of a user is on the touch screen, program 300 continues the process of writing and classifying the writing, and displaying said input. When the loop is interrupted and program 300 no longer receives feedback from multi-touch surface 100 via user interface 50, then program 300 ends. In another embodiment, program 300 receives input to terminate. For example, program 300 queries a user to manually terminate the program when a user selects the option to end program 300.

Figure 4:
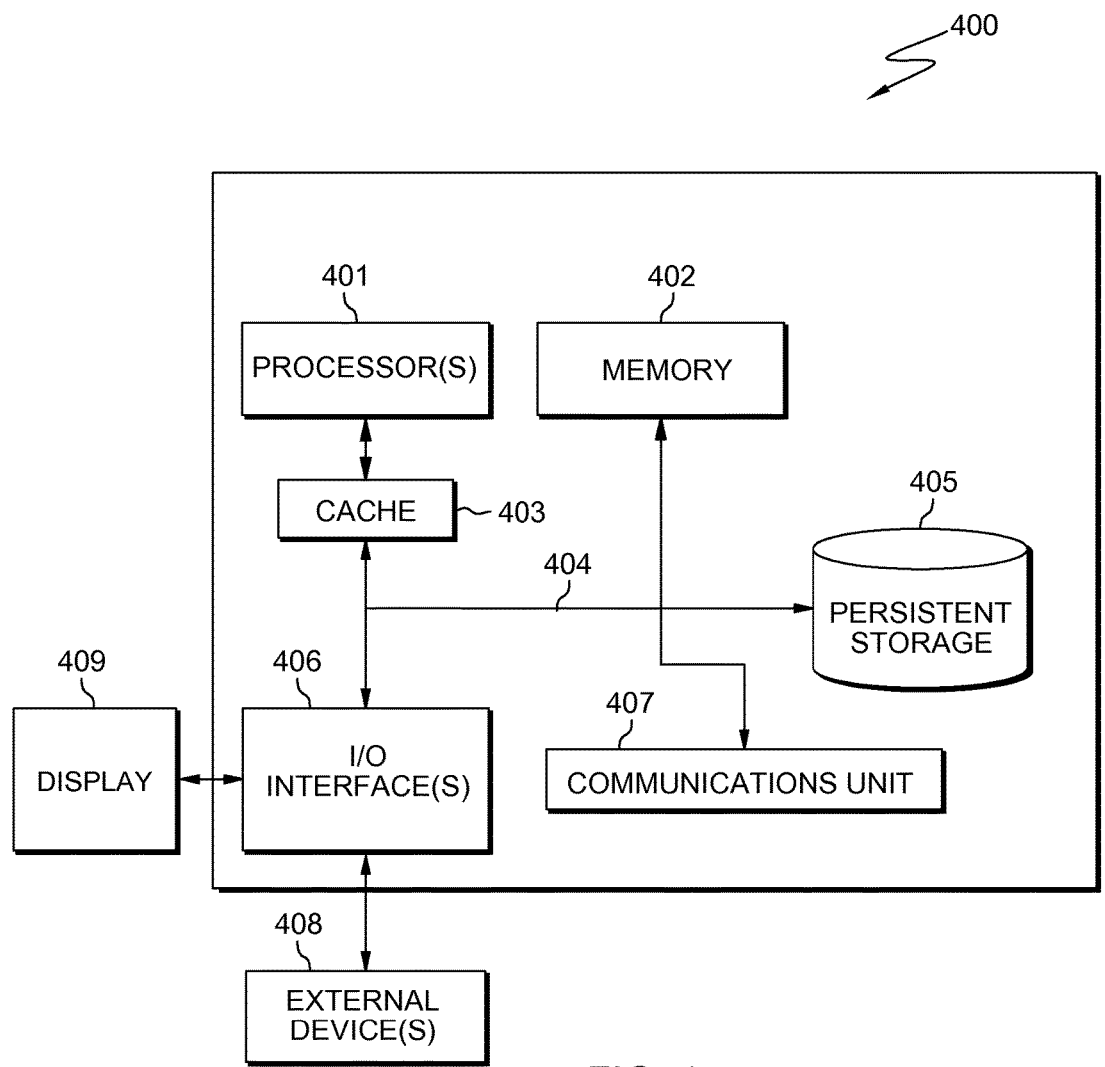
FIG. 4 depicts a block diagram of components of the server and/or the computing device of FIG. 1, in accordance with another embodiment of the present invention.

FIG. 4 depicts computer system 400, which is an example of a system that includes components of server 30 and/or computing device 40. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media such as, for example, thumb drives, portable optical or magnetic disks, and memory cards. Software and data used to practice embodiments of the present invention, e.g., client classifier program 80 and client classifier database 90, can be stored on such portable computer readable storage media and can be loaded onto persistent storage 405 of server 30 via I/O interface(s) 406 of server 30. Software and data used to practice embodiments of the present invention, e.g., multi-touch surface 100, can be stored on such portable computer readable storage media and can be loaded onto persistent storage 405 of computing device 40 via I/O interface(s) 406 of computing device 40. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for character identification on a multi-touch surface, the method comprising:

presenting, by one or more computer processors, a list of a plurality of general classifiers, and, in response to a user selecting one or more general classifiers from the list of the plurality of general classifiers, storing, by one or more computer processors, the one or more general classifiers in a profile associated with the user;

receiving, by one or more computer processors, data indicating a hand is on a touch-sensitive surface;

identifying, by one or more computer processors, a position of the hand;

determining, by one or more computer processors, a change in the position of the hand;

identifying, by one or more computer processors, the one or more general classifiers from the profile;

prompting, by one or more computer processors, the user to write a test character on the touch-sensitive surface;

selecting, by one or more computer processors, one or more additional general classifiers based, at least in part, on a written test character on the touch-sensitive surface;

identifying, by one or more computer processors, one or more specific classifiers from a plurality of specific classifiers based, at least in part, on a training phase;

modifying, by one or more computer processors, an algorithm based, at least in part, on the identified one or more general classifiers and the identified one or more specific classifiers;

the modified algorithm analyzing, by one or more computer processors, the change in the position of the hand;

the modified algorithm generating, by one or more computer processors, a list of characters that correspond to the analyzed change in the position of the hand, based, at least in part, on the one or more general classifiers; and to refine a characterization of the change in the position of the hand, selecting, by one or more computer processors, a character from the generated list of characters, based, at least in part, on the analyzed change in the position of the hand and the one or more specific classifiers.

2. The method of claim 1, further comprising:

presenting, by one or more computer processors, a list of a plurality of specific classifiers, and, in response to a user selecting one or more specific classifiers from the list of the plurality of specific classifiers, storing, by one or more computer processors, the one or more specific classifiers in the profile associated with the user; and identifying, by one or more computer processors, one or more additional specific classifiers based, at least in part, on the profile associated with the user, wherein the one or more additional specific classifiers further refine the characterization of the change in the position of the hand.

3. The method of claim 2, wherein the one or more general classifiers include a plurality of geographic location general classifiers, a plurality of language general classifiers, and a plurality of handedness general classifiers.

4. The method of claim 3, wherein the one or more specific classifiers includes a plurality of writing size specific classifiers, a plurality of writing style specific classifiers, and a plurality of writing font specific classifiers.

5. A computer program product for character identification on a multi-touch surface, the computer program product comprising:

one or more computer readable storage devices and program instructions stored on the one or more computer readable storage devices, the program instructions comprising:

program instructions to present, a list of a plurality of general classifiers, and, in response to a user selecting one or more general classifiers from the list of the plurality of general classifiers, and to execute program instructions to store the one or more general classifiers in a profile associated with the user;

program instructions to receive data indicating a hand is on a touch-sensitive surface;

program instructions to identify a position of the hand;

program instructions to determine a change in the position of the hand;

program instructions to identify the one or more general classifiers from the profile;

program instructions to prompt the user to write a test character on the touch-sensitive surface;

program instructions to select one or more additional general classifiers based, at least in part, on a written test character on the touch-sensitive surface;

program instructions to identify one or more specific classifiers from a plurality of specific classifiers based, at least in part, on a training phase;

program instructions to modify an algorithm based, at least in part, on the identified one or more general classifiers and the identified one or more specific classifiers;

program instructions to analyze, by the modified algorithm, the change in the position of the hand;

program instructions to generate, by the modified algorithm, a list of characters that correspond to the analyzed change in the position of the hand, based, at least in part, on the one or more general classifiers; and to refine a characterization of the change in the position of the hand, program instructions to select a character from the generated list of characters, based, at least in part, on the analyzed change in the position of the hand and the one or more specific classifiers.

6. The computer program product of claim 5, further comprising:

program instructions to present a list of a plurality of specific classifiers, and, in response to a user selecting one or more specific classifiers from the list of the plurality of specific classifiers, execute program instructions to store, by one or more computer processors, the one or more specific classifiers in the profile associated with the user; and program instructions to identify one or more additional specific classifiers based, at least in part, on the profile associated with the user, wherein the one or more additional specific classifiers further refine the characterization of the change in the position of the hand.

7. The computer program product of claim 6, wherein the one or more general classifiers include a plurality of geographic location general classifiers, a plurality of language general classifiers, and a plurality of handedness general classifiers.

8. The computer program product of claim 7, wherein the one or more specific classifiers includes a plurality of writing size specific classifiers, a plurality of writing style specific classifiers, and a plurality of writing font specific classifiers.

9. A computer system for character identification on a multi-touch surface, the computer system comprising:

one or more computer processors; and one or more computer readable storage devices;

program instructions stored on the computer readable storage devices for execution by at least one of the one or more computer processors, the program instructions comprising:

program instructions to present, a list of a plurality of general classifiers, and, in response to a user selecting one or more general classifiers from the list of the plurality of general classifiers, and to execute program instructions to store the one or more general classifiers in a profile associated with the user;

program instructions to receive data indicating a hand is on a touch-sensitive surface;

program instructions to identify a position of the hand;

program instructions to determine a change in the position of the hand;

program instructions to identify the one or more general classifiers from the profile;

program instructions to prompt the user to write a test character on the touch-sensitive surface;

program instructions to select one or more additional general classifiers based, at least in part, on a written test character on the touch-sensitive surface;

program instructions to identify one or more specific classifiers from a plurality of specific classifiers based, at least in part, on a training phase;

program instructions to modify an algorithm based, at least in part, on the identified one or more general classifiers and the identified one or more specific classifiers;

program instructions to analyze, by the modified algorithm, the change in the position of the hand;

program instructions to generate, by the modified algorithm, a list of characters that correspond to the analyzed change in the position of the hand, based, at least in part, on the one or more general classifiers; and to refine a characterization of the change in the position of the hand, program instructions to select a character from the generated list of characters, based, at least in part, on the analyzed change in the position of the hand and the one or more specific classifiers.

10. The computer system of claim 9, further comprising:

program instructions to present a list of a plurality of specific classifiers, and, in response to a user selecting one or more specific classifiers from the list of the plurality of specific classifiers, execute program instructions to store, by one or more computer processors, the one or more specific classifiers in the profile associated with the user; and program instructions to identify one or more additional specific classifiers based, at least in part, on the profile associated with the user, wherein the one or more additional specific classifiers further refine the characterization of the change in the position of the hand.

11. The computer system of claim 10, wherein the one or more general classifiers include a plurality of geographic location general classifiers, a plurality of language general classifiers, and a plurality of handedness general classifiers.

12. The computer system of claim 11, wherein the one or more specific classifiers includes a plurality of writing size specific classifiers, a plurality of writing style specific classifiers, and a plurality of writing font specific classifiers.

* * * * *